US006205467B1

(12) United States Patent
Lambrecht et al.

(10) Patent No.: US 6,205,467 B1
(45) Date of Patent: Mar. 20, 2001

(54) MICROPROCESSOR HAVING A CONTEXT SAVE UNIT FOR SAVING CONTEXT INDEPENDENT FROM INTERRUPT REQUESTS

(75) Inventors: J. Andrew Lambrecht, Austin; Brian C. Barnes, Round Rock, both of TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 08/557,312

(22) Filed: Nov. 14, 1995

(51) Int. Cl.⁷ ....................................................... G06F 9/00
(52) U.S. Cl. ............................................................ 709/108
(58) Field of Search ..................................... 395/678, 674, 395/677, 182.13; 709/100, 101, 102, 103, 105, 106, 107, 108

(56) References Cited

U.S. PATENT DOCUMENTS 5,437,047 * 7/1995 Nakamura ............................ 395/800

OTHER PUBLICATIONS

Tannenbaum et al, The Condor Distributed Processing System; Checkpoint and Migration of Unix Processes—Dr. Dobb's Journal Feb. 1995 v:20 n:2 p40(10).*

Nuth et al, A Mechanism for Efficient Context Switching, Computer Design, ICCD'91 1991 Intern. Conf. pp. 301–304.*

Plauger, P. J. The Header <Setjmp.h>, <Users Journal Oct. 1991 v:9 n:10 p:9(6).*

Inteil Corp., "MultiProcessor Specification", Version 1.1, Apr., 1994, pp. 1.1–Glossary 2.

Hummel, "PC Magazine Programmer's Technical Reference: The Processor and Coprocessor", 1992, pp. 153–182.

Intel Corp., "Microprocessor & Peripheral Handbook–vol. I Microprocessor", 1989, pp. 2–259 through 2–277.

Singh et al., "16–Bit and 32–Bit Microprocessors Architecture, Software, and Interfacing Techniques", 1991, pp. 302–305.

* cited by examiner

*Primary Examiner*—Majid Banankhah
(74) *Attorney, Agent, or Firm*—Conley, Rose & Tayon, PC; Robert C. Kowert; Lawrence J. Merkel (57) ABSTRACT

A microprocessor including a context save unit is provided. The context save unit is configured to periodically perform context saves. When the microprocessor receives an interrupt signal, the microprocessor enters the interrupt service routine without performing a context save. After completing execution of the interrupt service routine, the microprocessor restores the most recently saved context and begins executing the task at that saved context. The interrupt service routine is entered rapidly but the interrupt service routine does not include instructions for saving the registers which it utilizes to perform its function. The context save unit is configured to perform a context save at the occurrence of a variety of events. A fixed or variable time interval may be selected, and each interval includes several options.

27 Claims, 6 Drawing Sheets

| Bits → 31 | 16 | 15 | 0 | Addr |
|---|---|---|---|---|
| 0 | | TR | | 0 |
| ESP 0 | | | | 4 |
| 0 | | SS0 | | 8 |
| ESP 1 | | | | C |
| 0 | | SS1 | | 10 |
| ESP 2 | | | | 14 |
| 0 | | SS2 | | 18 |
| CR 3 | | | | 1C |
| EIP | | | | 20 |
| EFLAGS | | | | 24 |
| EAX | | | | 28 |
| ECX | | | | 2C |
| EDX | | | | 30 |
| EBX | | | | 34 |
| ESP | | | | 38 |
| EBP | | | | 3C |
| ESI | | | | 40 |
| EDI | | | | 44 |
| 0 | | ES | | 48 |
| 0 | | CS | | 4C |
| 0 | | SS | | 50 |
| 0 | | DS | | 54 |
| 0 | | FS | | 58 |
| 0 | | GS | | 5C |
| 0 | | LDT | | 60 |
| Bit Map Offset | | 0 | T | 64 |

MICROPROCESSOR HAVING A CONTEXT SAVE UNIT FOR SAVING CONTEXT INDEPENDENT FROM INTERRUPT REQUESTS

BACKGROUND OF THE INVENTION

1. Field of the Invention

This invention is related to the field of microprocessors and, more particularly, to context saving mechanisms and interrupt handling within microprocessors.

2. Description of the Relevant Art

Modern computer systems and the software which runs thereon demand a high performance interrupt structure in order to operate efficiently. Interrupts are used to switch between tasks, and so a multi-tasking operating system benefits from a high performance interrupt structure. A "multi-tasking" operating system is configured to run multiple programs concurrently. Additionally, interrupts provide a means for an electronic device external to the microprocessor to request attention from the operating system. Modern day computer systems are including increasing numbers of these electronic devices, prompting the need for a high performance interrupt structure.

Interrupts cause a microprocessor within the computer system to execute a specific software routine (referred to as an interrupt service routine) comprising a set of instructions. The interrupt is typically unrelated to the instructions being executed by the microprocessor. Instead, the interrupt is caused by an external device requiring software attention. For example, a buffer within an input/output device may fill with data to be transferred to another device or to memory. Many other sources for interrupts are well-known to the skilled artisan.

The instructions being executed by the microprocessor at the time the interrupt occurs are referred to herein as a "task". A task may be a portion of a program, an operating system routine, or even another interrupt service routine. The interrupt service routine is stored in memory at an address indicated by an interrupt vector associated with the interrupt.

Because the interrupt is normally unrelated to the task being performed by the microprocessor and is asynchronous to the task itself, the interrupt service routine is executed in such a way that the task may be resumed. In order to resume the task, the "context" within which the task is executing is saved to memory. The context includes register values associated with the task when the task is interrupted. Additionally, the context includes the values within any memory locations that may be accessible to the task. The register portion of the context is saved to memory, and the memory locations are saved by causing the current values stored therein to be visible to the computer system. For example, memory locations are saved if stored into a data cache and the data cache is maintained coherent with main memory. After saving the context, the interrupt service routine is executed. Upon completion of the interrupt service routine, the context is restored to the microprocessor and the task is resumed. Since the restored context is identical to the context when the task was interrupted, the task executes normally. In other words, the interrupt had no effect on the result of executing the task if the task is unrelated to the interrupt. Instead, only the time required to execute the task is affected.

The memory locations in which the context is saved, referred to herein as a context storage location, are typically indicated by an address stored in a register or a data structure. The microprocessor architecture implemented by the microprocessor may specify where and how the context storage location is located. Conversely, the particular operating system running on the computer system employing the microprocessor may determine where and how the context storage location is located. For example, a microprocessor employing the x86 microprocessor architecture includes a task register which identifies the address in memory in which the current context is to be stored. Included in the context storage location is a value which indicates the origin of the task as well as many of the registers defined by the x86 architecture. The origin of a particular task may be another task which invoked the particular task, for example. More information regarding the interrupt structure and the context stored in the x86 architecture may be found in the publication entitled: "PC Magazine Programmer's Technical Reference: The Processor and Coprocessor" by Robert L. Hummel, Ziff-Davis Press, Emeryville, Calif., 1992. This publication is incorporated herein by reference in its entirety.

The x86 architecture defines the context of 32 bit microprocessors to be 68 bytes. Additionally, when the segment registers (which are part of the context in the x86 architecture) are reloaded, segment reloads are initiated to translate the segments. More bytes are transferred when the reload occurs, and clock cycles are required to translate the extra bytes into a format for storing within the microprocessor.

Unfortunately, storing a large number of bytes to memory (as a context save entails) often requires a relatively large number of clock cycles. A clock cycle refers to the amount of time required by portions of the microprocessor to perform their functions. At the end of the clock cycle, the results of each function are stored in a storage location (e.g. a register or memory) and may be used by another function in the next clock cycle. The bus used by a microprocessor to communicate with other electrical devices may operate according to a different clock cycle than the microprocessor itself. The clock cycle associated with the bus is often referred to as the bus clock cycle.

If the context is saved by the microprocessor when an interrupt is recognized by the microprocessor, the interrupt is being handled via a "task switch". The interrupt service routine is isolated from the interrupted task such that any modifications the interrupt service routine performs to the microprocessor's context information will not affect the operation of the task when resumed. The context is restored prior to resuming the task. Often, an interrupt service routine will only require access to a few registers within the register set to perform its function. In this case, a full context save is not necessary since some registers will not be modified by the interrupt service routine. Instead, only those storage locations which must be changed in order to fetch the instructions within the interrupt service routine need be saved prior to beginning execution of the interrupt service routine. For example, in the x86 architecture the EIP register and CS segment register (which define the address and segment of the instructions to be fetched and executed) and the flags register (which is modified by many of the x86 instructions) are saved. These values are pushed onto the stack defined by the x86 architecture when not using the task switch method of interrupt handling.

When the task switch method of interrupt handling is not in use, an interrupt service routine must save the values stored within registers which it employs to carry out its intended function. Often, the values are stored on the stack. This method of interrupt handling is referred to as an interrupt gate or trap gate in the x86 architecture, depending on whether or not the interrupt service routine may itself be interrupted. If the interrupt service routine does not use all of the microprocessor's context, then clock cycles may be saved with respect to performing the full context save of a task switch. The interrupt service routine is entered and exited more rapidly since context save and restore is not performed. Unfortunately, at least a few registers must still be stored. Additionally, the instruction code required to store the registers and restore them at the completion of the routine lengthens the corresponding interrupt service routine. Furthermore, an administrative burden is placed upon the programmer of the interrupt service routine to update instruction code for saving and restoring registers when the interrupt service routine is changed. An interrupt handling mechanism for a microprocessor which rapidly switches from a task to an interrupt handler without applying the burdens of context save to each interrupt service routine is desired.

SUMMARY OF THE INVENTION

The problems outlined above are in large part solved by a microprocessor and computer system according to the present invention. The present microprocessor includes a context save unit configured to periodically perform context saves. When the microprocessor receives an interrupt signal, the microprocessor enters the interrupt service routine without performing a context save: After completing execution of the interrupt service routine, the microprocessor restores the most recently saved context and begins executing the task at that saved context. Advantageously, the interrupt service routine is entered rapidly but the interrupt service routine does not include instructions for saving the registers which it utilizes to perform its function. Performance of the microprocessor and computer system may be increased over that previously achievable using conventional interrupt handling techniques.

The context save unit is configured to perform a context save at the occurrence of a variety of events. A fixed or variable time interval may be selected. The fixed time interval may be a programmable number of clock cycles. Alternatively, the fixed time interval may be a programmable number of bus clock cycles. The variable time interval includes several options. A first option is to perform a context save after a programmable number of consecutive idle bus cycles have occurred. A second option is to perform a context save when a number of store memory accesses have been performed subsequent to the most recent context save. A context save may be performed when a task completes as a third option. The many and varied events which may cause a context save provide a rich, flexible structure for tailoring context saves to a particular computer system or operating system running thereon.

Broadly speaking, the present invention contemplates a method for speeding interrupt handling in a microprocessor, comprising several steps. A context of the microprocessor is saved periodically into a context storage location. The context save is performed during execution of a task, independent of an interrupt signal received by the microprocessor. The interrupt signal is received into the microprocessor. An interrupt service routine, stored at an interrupt vector associated with the interrupt signal is then executed by the microprocessor. Upon completion of the interrupt service routine, the microprocessor returns to the interrupted task according to the context saved prior to receiving the interrupt signal.

The present invention further contemplates a microprocessor comprising an interrupt conductor, a context save unit, a register file, and a data cache. The interrupt conductor is configured to convey an interrupt signal indicative of a request to execute an interrupt service routine. The context save unit is configured to save a context of the microprocessor to a context storage location independent of the interrupt signal. Furthermore, the context save unit is configured to effect the context save. Coupled to the context save unit is the register file and the data cache. The register file is configured to store a portion of the context, as is the data cache.

The present invention still further contemplates a computer system comprising a microprocessor and an interrupt controller. The microprocessor is configured similar to the above mentioned microprocessor. Coupled to the interrupt conductor of the microprocessor is the interrupt controller, wherein the interrupt controller is configured to convey the interrupt signal to the microprocessor.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
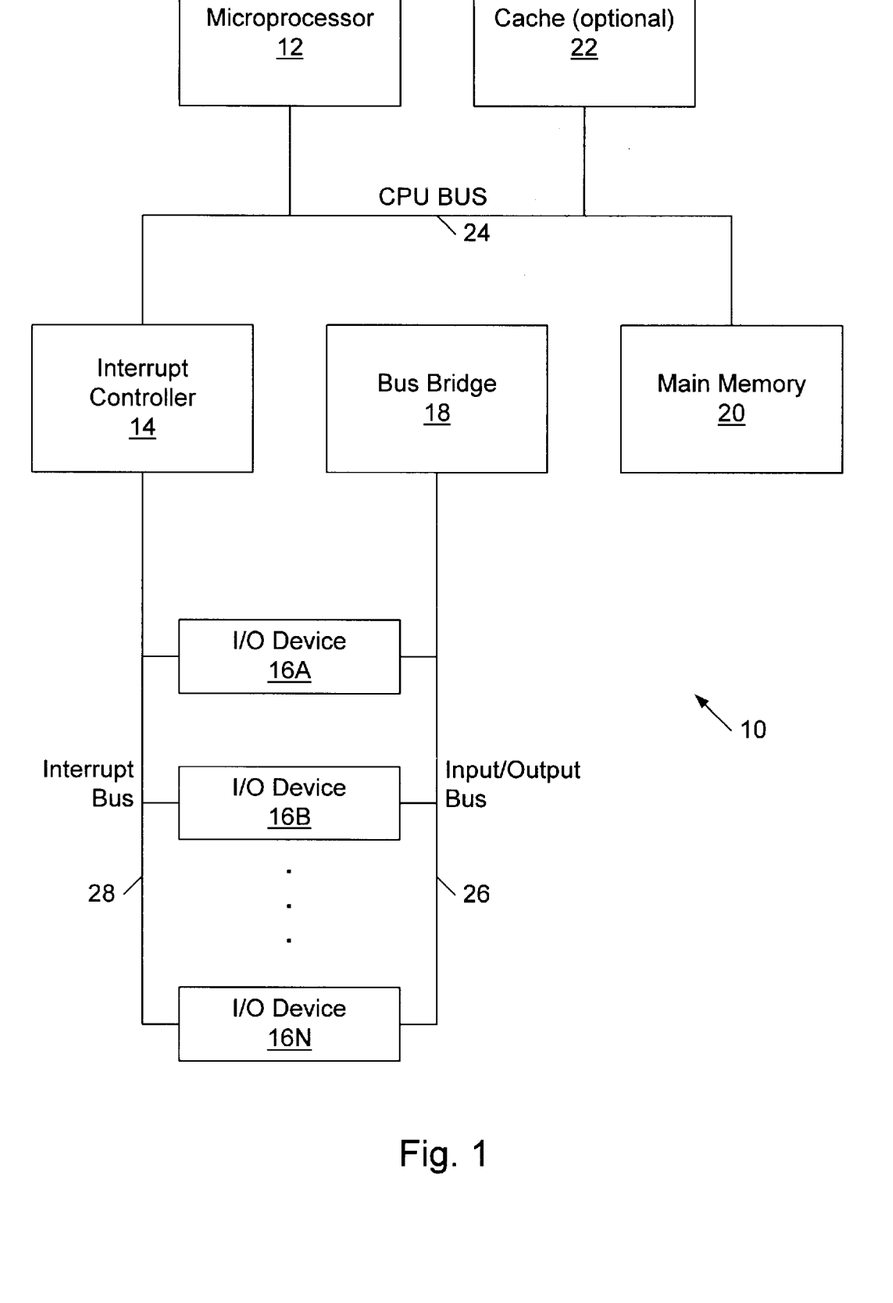
FIG. 1 is a block diagram of a computer system including a microprocessor according to the present invention.

Turning now to FIG. 1, a computer system 10 including a microprocessor 12, an interrupt controller 14, a plurality of input/output (I/O) devices 16A–16N (referred to collectively as I/O devices 16), a bus bridge 18, a main memory 20, and a cache 22 is shown. Microprocessor 12, interrupt controller 14, bus bridge 18, main memory 20, and cache 22 are coupled to a CPU bus 24 which effects high speed, high bandwidth communication between the connected devices. Lower speed, lower bandwidth communication is provided for I/O devices 16 via input/output bus 26. I/O devices 16 are coupled to interrupt controller 14 via an interrupt bus 28.

Microprocessor 12 includes hardware configured to periodically save the context of the executing task. The context save is performed even in the absence of any interrupt indication. When an interrupt is signalled via interrupt controller 14, microprocessor 12 immediately fetches the appropriate interrupt service routine. No clock cycles are used to save the context since a recent context has already been saved. Advantageously, the interrupt service routine is entered more rapidly than was previously achievable, and yet a full context save has been achieved. The results from the instructions executed between the previous context save and the interrupt are discarded, but the context indicates that the task should be resumed at the point in the task at which the context save occurred. The context is restored at the completion of the interrupt service routine, and so the task executes correctly.

Interrupt bus 28 includes at least one interrupt conductor per I/O device 16A–16N. An interrupt request signal conveyed on the associated interrupt conductor is indicative of a request for interrupt of microprocessor 12 by the associated I/O device 16A–16N. Interrupt controller 14 is configured to receive the interrupt request signals and to convey an interrupt signal to microprocessor 12 upon CPU bus 24 in response to the interrupt request signals. In one embodiment, interrupt controller 14 is an 8259A interrupt controller used in IBM compatible personal computer systems. In another embodiment, interrupt controller 14 includes multiple interrupt controllers similar to the 8259A cascaded to allow a larger number of I/O devices 16 to be connected. Interrupt controller 14 is programmable, and may be enabled to assert the interrupt signal individually for each interrupt request signal. In other words, interrupt controller may be enabled to assert the interrupt signal if the interrupt request signal from I/O device 16A is asserted but not if the interrupt request signal from I/O device 16B is asserted (or vice-versa). In another embodiment, interrupt controller 14 may be programmed with a priority scheme for the interrupt request signals. The priority scheme is devised such that, if multiple interrupt request lines are asserted concurrently: the highest priority interrupt request is serviced first; followed by the next highest priority interrupt request; etc.

Interrupt controller 14 provides the interrupt vector which identifies the location of the interrupt service routine associated with the interrupting I/O device 16A–16N. The interrupt vector is transferred across CPU bus 24 after microprocessor 12 acknowledges receipt of the interrupt signal. In one embodiment, microprocessor 12 issues an interrupt acknowledge transaction on CPU bus 24 when acknowledging the interrupt signal, and then issues a second interrupt acknowledge transaction to collect the interrupt vector. Other transactions upon CPU bus 24 are used to transfer data among devices coupled to CPU bus 24. An exemplary bus implementing such an interrupt acknowledge transaction may be found within the publication entitled: "16-bit and 32-bit Microprocessors Architecture, Software and Interfacing Techniques" by Singh, et al, Prentice Hall, Englewood Cliffs, N.J., 1991. This publication is incorporated herein by reference in its entirety.

Bus bridge 18 is provided to assist in communications (other than interrupt requests) between I/O devices 16 and devices coupled to CPU bus 24. I/O devices 16 typically require longer bus clock cycles than microprocessor 12 and other devices coupled to CPU bus 24. Therefore, bus bridge 18 provides a buffer between CPU bus 24 and input/output bus 26. Additionally, bus bridge 18 translates transactions from one bus protocol to another. In one embodiment, input/output bus 26 is an Enhanced Industry Standard Architecture (EISA) bus and bus bridge 18 translates from the CPU bus protocol to the EISA bus protocol. In another embodiment, input/output bus 26 is a Peripheral Component Interconnect (PCI) bus and bus bridge 18 translates from the CPU bus protocol to the PCI bus protocol. It is noted that many variations of CPU bus protocols exist. Microprocessor 12 may employ any suitable bus protocol.

I/O devices 16 provide an interface between computer system 10 and other devices external to the computer system. Exemplary I/O devices include a modem, a serial or parallel port, a sound card, etc. I/O devices 16 may also be referred to as peripheral devices. Main memory 20 stores data and instructions for use by microprocessor 12. Cache 22 is a small, high speed memory for temporarily storing data and instructions from main memory 20. If microprocessor 12 requests an address from main memory 20 and cache 22 is storing data associated with the requested address, then cache 22 provides the data. Cache 22 is an optional component, computer system 10 is fully functional without it. However, cache 22 may improve the performance of computer system 10. It is noted that cache 22 may also be inserted between microprocessor 12 and CPU bus 24 in other embodiments.

It is further noted that, although FIG. 1 shows interrupt controller 14 coupled to CPU bus 24, interrupt controller 14 may in fact be coupled to I/O bus 26 or another I/O bus. When interrupt controller 14 is configured in this manner, interrupt acknowledge bus transactions are conveyed to the interrupt controller through one or more bus bridges similar to bus bridge 18. Often, when interrupt controller 14 is not coupled to CPU bus 24 to receive bus transactions, interrupt controller 14 is still coupled directly to an interrupt conductor within CPU bus 24 in order to convey the aforementioned interrupt signal.

Figure 2:
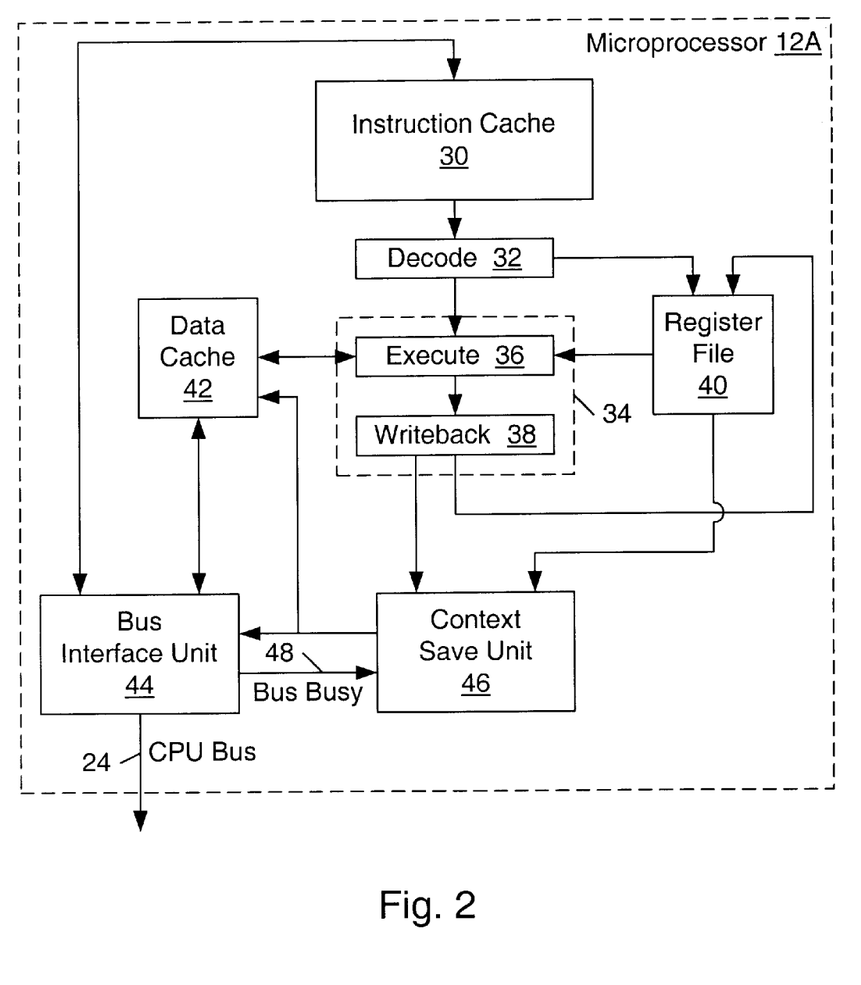
FIG. 2 is a block diagram of one embodiment of the microprocessor shown in FIG. 1, including a context save unit.

Turning now to FIG. 2, a first embodiment 12A of the microprocessor 12 (shown in FIG. 1) is shown in block diagram form. Microprocessor 12A includes an instruction cache 30 coupled to a decode unit 32 which is in turn coupled to an execution unit 34. Execution unit 34 includes an execute stage 36 and a writeback stage 38. A register file 40 is coupled to decode unit 32, execute stage 36, and writeback stage 38. Microprocessor 12A also includes a data cache 42 coupled between execute stage 36 and a bus interface unit 44. Bus interface unit 44 is additionally coupled to instruction cache 30 and CPU bus 24. A context save unit 46 is coupled to writeback stage 38, register file 40, data cache 42, and bus interface unit 44.

Generally speaking, context save unit 46 is configured to provide the periodic saving of context employed by microprocessor 12A to enhance performance by providing a rapid transition to interrupt service routines. Context save unit 46 is configured to save the context of microprocessor 12A at the occurrence of one of several events. Each event may be programmed, and may be enabled or disabled. A first set of events causes a context save at the expiration of a fixed time interval. The length of the fixed interval may be programmed to a desirable time interval depending upon the frequency of interrupts in the computer system 10 within which microprocessor 12A is employed. In one embodiment, the fixed time interval is measured in clock cycles. In another embodiment, the fixed time interval is measured in bus clock cycles. Advantageously, a mechanism for guaranteeing a context save at least once within each time interval is achieved.

Context save unit 46 is additionally configured to perform a context save at the expiration of a variable time interval. The variable time interval may expire in different numbers of clock cycles from one interval to the next interval. In one embodiment, the variable time interval expires when CPU bus 24 has remained idle for a programmable number of consecutive bus clock cycles. This interval is variable because if bus activity occurs during the interval, then the counted number of idle bus clock cycles is reduced to zero and counting of idle bus cycles begins again. Advantageously, context saves occur when the bus is idle. Therefore, the bus clock cycles needed by microprocessor 12A or other devices coupled to CPU bus 24 are not used to perform context saves. The variable time interval is also configured to expire when the number of store memory accesses stored by context save unit 46 exceeds a programmable value. Advantageously, the number of stores saved by context save unit 46 is limited (as well as the storage space required to hold the stores). Additionally, the variable time interval expires when a task ends. The final context created by the task is saved and is available to other tasks (for example, the task which originated the completing task).

Context save unit 46 is further configured to collect store memory accesses from execution unit 34. Stores to memory change the context of microprocessor 12A, and so are not committed between a pair of context saves since memory locations are not saved in the context storage location. If the store memory accesses were committed to memory prior to the second of the pair of context saves and then an interrupt were accepted prior to that second context save, an incorrect context would be restored at the completion of the interrupt service routine. Although the registers would contain correct values for resumption of the interrupted task at the instruction indicated by the first saved context, memory locations that were modified by some instructions between the pair of context saves have already been performed and have not been restored to their values at the time the first context save occurred. If an instruction between the resumed instruction and one of the previously committed store instructions accesses the address stored to by the previously committed store instruction, then the task would not execute correctly.

Load memory accesses are performed to data cache 42 and context save unit 46 in parallel. If a load memory access to an address of a store memory access held in context save unit 46 is executed, context save unit 46 provides the data. Otherwise, data cache 42 provides the data. When a context save occurs, the stores held by context save unit 46 are stored to data cache 42 and/or main memory 20 through bus interface unit 44.

Prior to performing a context save, microprocessor 12A stalls instruction execution until the contents of register file 40 are copied into context save unit 46. Register file 40 is configured to rapidly transfer its contents to context save unit 46 so that the stall requires relatively few clock cycles. Additionally, other context registers which may be stored in other units are copied to context save unit 46. Instruction execution is then allowed to continue. It is noted that the store memory accesses may be collected outside of context save unit 46 in other embodiments.

Other portions of microprocessor 12A will next be described. Bus interface unit 44 effects communication between microprocessor 12A and other devices coupled to CPU bus 24. For example, instruction code fetches which miss in instruction cache 30 are transferred from main memory 20 (shown in FIG. 1) to instruction cache 30 through bus interface unit 44. Additionally, data memory accesses which miss data cache 42 are transferred from main memory 20 to data cache 42. Data cache 42 may store modified data which must be written back to main memory 20, the transfer of which is also effected by bus interface unit 44. A bus busy signal upon a bus busy conductor 48 coupled between bus interface unit 44 and context save unit 46 is also provided. The bus busy signal is indicative of the idle or busy state of the CPU bus 24 during a clock cycle, and is used in the above mentioned variable time interval based on CPU bus 24 being idle for a programmable number of consecutive clock cycles.

Bus interface unit 44 is adapted to receive the aforementioned interrupt signal upon CPU bus 24 as well. When the interrupt signal is received in a state indicative of a request for interrupt, bus interface unit 44 conveys a signal indicative of interrupt to instruction cache 30. Logic within instruction cache 30 discards instructions currently being fetched and awaits the address of the interrupt service routine. Additionally, context save unit 46 discards any store memory accesses collected since the most recent context save. Bus interface unit 44 reads the interrupt vector from interrupt controller 14 and performs the appropriate translation of the interrupt vector into an interrupt address. For example, in the x86 architecture the interrupt vector is used as an index into an interrupt descriptor table which provides protection information indicative of the privilege level and allowable memory access of the interrupt service routine as well as the interrupt service routine address. More information regarding the x86 interrupt structure may be found in the above mentioned reference.

Once instruction cache 30 receives the address of the interrupt service routine, code fetch and instruction execution begins at the address. No clock cycles are used to provide a context save. Instead, the information saved during the most recent periodic context save is the context that will be restored. Stores which are being held in context save unit 46 or data cache 42 are discarded, and so the context saved at the most recent periodic context save is correct. When execution of the interrupt handler is completed, then the most recent periodic context save is restored. Execution of the interrupted task is then resumed.

Instruction cache 30 is a high speed cache memory capable of storing and retrieving instruction code. It is noted that instruction cache 30 may be configured as a set-associative or direct-mapped cache. Instructions fetched from instruction cache 30 are transferred to decode unit 32, which decodes the instruction to determine the operands used by the instruction as well as to bit-encode the instruction for execution unit 34. Decode unit 32 fetches register operands from register file 40 such that the values will be transferred to execution unit 34. In this manner, execution unit 34 receives its register operands during the same clock cycle that it receives its instruction.

Execution unit 34 includes execute stage 36 and writeback stage 38. Execute stage 36 executes the instruction provided by decode unit 32, producing a result. If the instruction utilizes a memory operand, the memory operand is transferred from data cache 42 or from context save unit 46 prior to execution of the instruction. Writeback stage 38 stores the result generated by execute stage 36 into a destination specified by the instruction. The destination may be within register file 40 or data cache 42, in one embodiment.

Register file 40 is configured to store register operands for use by execution unit 34. Additionally, register file 40 is configured to transfer its contents to context save unit 46 when a context save is occurring. In one embodiment, register file 40 stores the x86 register set which includes the EAX, EBX, ECX, EDX, EBP, ESI, EDI and ESP registers. Additionally, register file 40 may store the segment registers of the x86 architecture, as well as other miscellaneous registers.

Data cache 42 is a high speed cache memory configured to store data bytes being manipulated by microprocessor 12A. It is understood that data cache 42 may be configured in a set associative or direct-mapped configuration.

Figure 3:
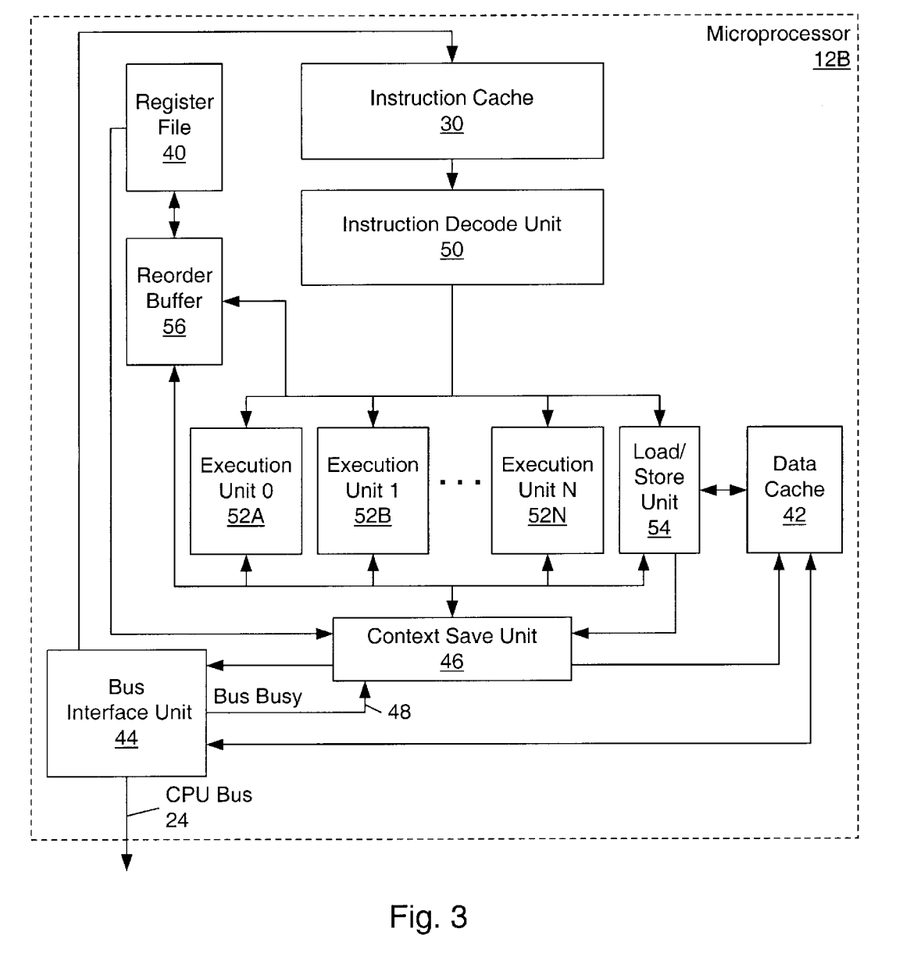
FIG. 3 is a block diagram of another embodiment of the microprocessor shown in FIG. 1, including a context save unit.

Turning now to FIG. 3, a second embodiment of microprocessor 12 (microprocessor 12B) is shown as a block diagram. Similar to microprocessor 12A, microprocessor 12B includes a bus interface unit 44, an instruction cache 30, a data cache 42, a register file 40, and a context save unit 46. Additionally, microprocessor 12B includes a multiple instruction decode unit 50 coupled between instruction cache 30 and a plurality of execution units 52A–52N (referred to collectively as execution units 52). A load/store unit 54 is included to interface between execution units 52 and data cache 42. Finally, a reorder buffer 56 is coupled to decode unit 50, execution units 52, and load/store unit 54.

Microprocessor 12B is a superscalar microprocessor configured to execute multiple instructions during a clock cycle. Decode unit 50 therefore decodes multiple instructions during a single clock cycle and dispatches the instructions to execution units 52. Additionally, a storage location within reorder buffer 56 is allocated for each decoded and dispatched instruction. The storage locations are allocated to instructions in the order they occur within the task, so that the results created by executing the instructions may be recorded in register file 40 or data cache 42 in program order. By including reorder buffer 56, instructions may be speculatively executed out of order by execution units 52. In one embodiment, execution units 52 are asymmetrical execution units. Each execution unit 52A–52N is configured to execute a particular subset of microprocessor 12B's instruction set. The particular subset of the instruction set which execution unit 52A is configured to execute may differ from the particular subset of the instruction set which execution unit 52B is configured to execute. Similarly, other execution units may have differing particular subsets of the instruction set. In another embodiment, execution units 52 are symmetrical execution units. Each execution unit 52A–52N is configured to execute a similar subset of the instruction set.

Reorder buffer 56 provides dependency checking and result forwarding such that each instruction receives the correct operand values prior to that instruction being executed. Reorder buffer 56 includes temporary storage for the result of each instruction until that instruction is retired by reorder buffer 56. An instruction is retired by storing its result into register file 40 or data cache 42 (if needed) and deleting the instruction from reorder buffer 56. If an instruction decoded by decode unit 50 requires the result of an instruction which has not yet executed, then a tag indicative of which reorder buffer storage location will store that result is forwarded to the execution unit receiving the instruction in lieu of the operand value. The execution unit then monitors the results produced by the execution units for the provided tag. When the result is generated, the execution unit generating the result conveys the tag along with the result to reorder buffer 56. The execution unit awaiting the tag captures the result and stores it along with the instruction for later execution. Monitoring for the register tag and capturing the associated result is referred to as "result forwarding". It is noted that any suitable reorder buffer configuration may be employed by microprocessor 12B.

Execution units 52 and load/store unit 54 may employ reservation stations to store instructions dispatched to the unit. An instruction remains in the reservation station until all of its operands are available, and then is executed by the associated execution unit. It is noted that load/store unit 54 performs store memory accesses in program order. Reorder buffer 56 conveys a value to load/store unit 54 indicative of which store memory accesses may be performed. When load/store unit 54 performs a store memory access, it is collected by context save unit 46. When a context save occurs, context save unit 46 transfers the collected store memory accesses to data cache 42 or main memory 20 through bus interface unit 44. It is noted that the above mentioned reservation stations may be configured outside of the associated execution unit.

Instructions are retired in program order from reorder buffer 56. Therefore, when context save unit 46 determines that a context save should be performed, the contents of register file 40 may be copied to context save unit 46. Because register file 40 includes the updates made by all instructions up to a known point in the task, the context is saved at the known point in the task. Reorder buffer 56 is stalled from retiring instructions until the contents of register file 40 may be copied to context save unit 46, similar to the stalling in microprocessor 12A.

During a clock cycle in which the interrupt signal is received by bus interface unit 44, context save unit 46 discards the store memory accesses collected since the most recent context save. Additionally, context save unit 46 ignores store memory accesses which may be performed by instructions already dispatched by decode unit 50 prior to dispatching instructions from the interrupt service routine. Instructions remaining within execution units 52, load/store unit 54, and reorder buffer 56 are flushed, and the interrupt service routine is executed. No clock cycles are used to perform a context save. Instead, the most recently saved context will be restored after the interrupt service routine has completed execution.

Additional information regarding microprocessors may be found within the commonly assigned, co-pending patent application entitled "High Performance Superscalar Microprocessor", Ser. No. 08/146,382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377843, filed Jan. 25, 1995 by Witt, et al. The disclosures of these patent applications are incorporated herein by reference in their entirety.

Figure 4:
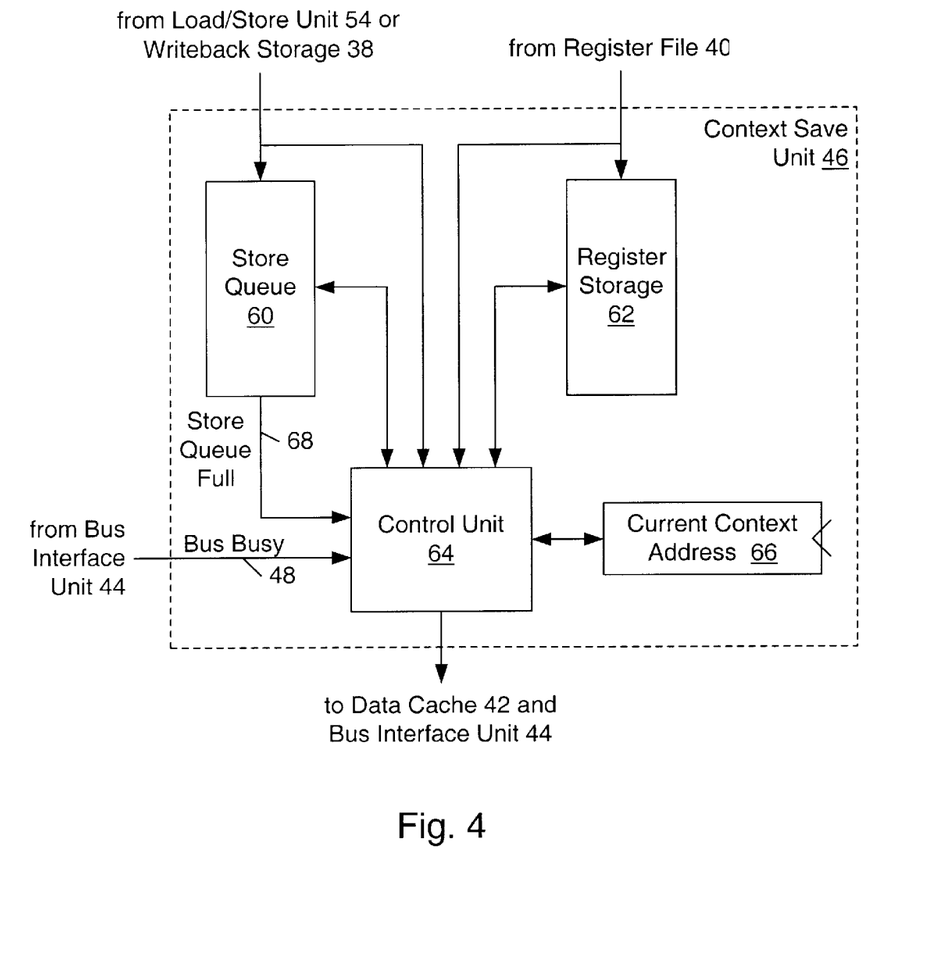
FIG. 4 is a block diagram of one embodiment of a context save unit according to the present invention, including a control unit.

Turning now to FIG. 4, a block diagram of one embodiment of context save unit 46 is shown. The embodiment shown in FIG. 4 is suitable for use in microprocessor 12A or 12B, as well as other embodiments of microprocessor 12. Context save unit 46 includes a store queue 60, a register storage 62, a control unit 64, and a current context address register 66. Store queue 60 includes a plurality of storage locations for collecting store memory accesses. Under the control of control unit 64, store queue 60 collects store memory accesses from load/store unit 54 (when context save unit 46 is configured into microprocessor 12B) or from writeback stage 38 (when context save unit 46 is configured into microprocessor 12A). Included within each storage location of store queue 60 is an address associated with the store memory access and the data to be stored at the address. Additionally, the size (in bytes) of the store memory access is stored within store queue 60.

Register storage 62 provides temporary storage of the registers of microprocessor 12 which are included within the context of microprocessor 12. During a clock cycle in which context save unit 46 determines to perform a context save, the contents of each register are transferred into register storage 62 under the control of control unit 64. Control unit 64 is configured to store each of the registers within register storage 62 to the appropriate position within the context storage location.

Additionally, store memory accesses within store queue 60 are performed at the time a context save is performed. New store memory accesses may be added to store queue 60 prior to emptying the store memory accesses associated with the context save being performed. Control unit 64 is configured to store a value indicative of the last store associated with the current context save to prevent storing any new store memory accesses until a subsequent context save is performed. Store queue 60 may only store a finite number of store memory accesses, and so store queue 60 produces a signal indicative of the fullness of store queue 60. This signal may be programmed to activate after any number of stores have been placed into store queue 60 (up to the number of storage locations configured into the store queue). The signal is conveyed upon store queue full conductor 68 to control unit 64. Control unit 64 is configured to cause a context save if the store queue full signal is activated.

Control unit 64 performs the context save into a context storage location identified by the address stored within current context address register 66. Addresses for each datum being stored are conveyed along with the datum to data cache 42 and bus interface unit 44. If the address hits in data cache 42, then the datum is stored in data cache 42. Otherwise, bus interface unit 44 transfers the datum to main memory. Current context address register 66 is programmed to the address of the context storage location associated with the task executing within microprocessor 12. In embodiments of microprocessor 12 implementing the x86 architecture, current context address register 66 is the task register (TR). Whenever a task switch is performed by microprocessor 12, the address of the context storage location associated with the new task is loaded into current context address register 66.

Figure 5:
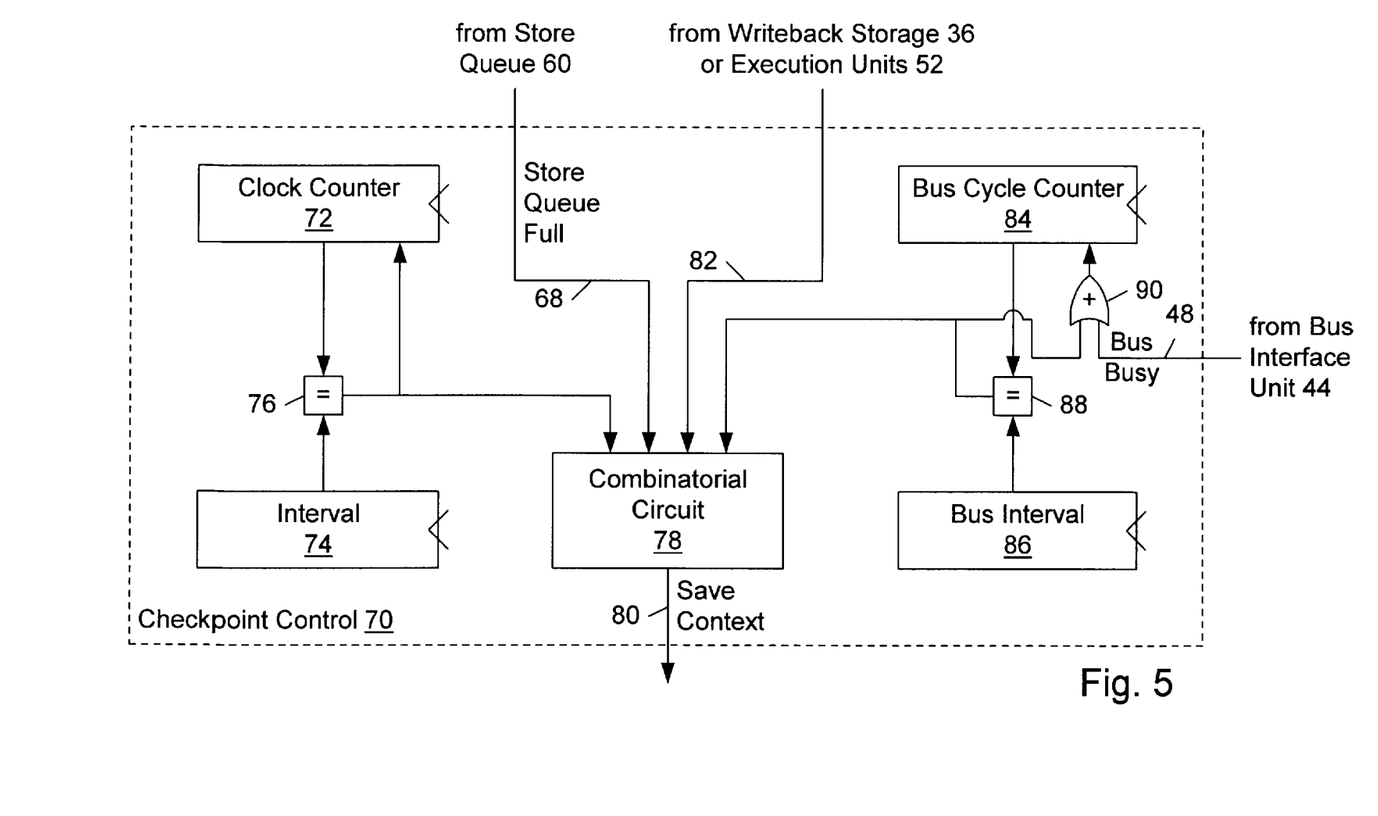
FIG. 5 is a logic diagram of one embodiment of the control unit shown in FIG. 4.

Turning now to FIG. 5, a logic diagram of a checkpoint control unit 70 configured within control unit 64 (shown in FIG. 4) is shown. Checkpoint control unit 70 includes the circuits which determine when to perform a context save. A clock counter register 72, an interval register 74, and a comparator 76 are included to generate the fixed time interval context save events. Clock counter register 72 is configured to be incremented at regular intervals. In one embodiment, clock counter register 72 is incremented each clock cycle. In another embodiment, clock counter register 72 is incremented each bus clock cycle. Interval register 74 is programmed to a value corresponding to the desired fixed time interval between context saves. Comparator 76 compares the values stored within clock counter register 72 and interval register 74.

During a clock cycle in which clock counter register 72 is storing a value equal to the value stored in interval register 74, comparator 76 asserts an output signal indicative of equality. This output signal is conveyed to combinatorial circuit 78, which combines the output signal with a corresponding enable bit stored in an enable register within combinatorial circuit 78. If the fixed time interval event is enabled, then a save context signal upon save context conductor 80 is asserted. Additionally, the output signal of comparator 76 is conveyed to a reset input upon clock counter register 72. When a signal upon the reset input of clock counter register 72 is asserted, clock counter register 72 is cleared to a zero value. Therefore, clock counter register 72 begins counting the next fixed time interval when the current fixed time interval expires. Other logic circuits within control unit 64 receive the save context signal and cause a context save to occur upon assertion of the save context signal. In one embodiment, interval register 74 and clock counter register 72 are sixteen bits wide and may store a value between zero and 65535 clock cycles.

Variable time interval functions are supplied to combinatorial circuit 78 as well. The store queue full signal from store queue 60 (conveyed upon conductor 68) is one variable time interval function. If the store queue full signal is asserted, then the save context signal is asserted by combinatorial circuit 78. Similarly, if an end of task signal is asserted by writeback stage 36 (shown in FIG. 2) or one of execution units 52 (shown in FIG. 3) then the save context signal is asserted by combinatorial circuit 78. The end of task signal is conveyed upon end of task conductor 82, and indicates that the current task is being exited. In one embodiment, the end of task signal is asserted if the task is ending, or if a task switch is occurring other than in response to an interrupt.

Bus cycle counter register 84, bus interval register 86, comparator 88, combinatorial circuit 90 form an exemplary logic circuit for performing the bus idle variable time interval. As described above, the bus idle variable time interval expires when CPU bus 24 has been idle for a number of consecutive clock cycles. The desired number of consecutive clock cycles is programmed into bus interval register 86. Bus cycle counter register 84, similar to one embodiment of clock counter register 72, is incremented each bus clock cycle and is cleared upon assertion of a signal upon a reset input. Comparator 88 is similar to comparator 76, comparing the values stored in bus cycle counter register 84 and bus interval register 86. However, the output signal of comparator 88 is combined with the bus busy signal conveyed upon bus busy conductor 48. If the bus busy signal is asserted (indicating that CPU bus 24 is no longer idle) then bus cycle counter register is cleared through combinatorial circuit 90. Therefore, the variable time interval expires when the number of consecutive bus clock cycles programmed into bus interval register 86 expires with the bus remaining idle. Additionally, when the output signal of comparator circuit is asserted, bus cycle counter register 84 is cleared (similar to the fixed time interval circuit). When the number of consecutive idle bus cycles stored in bus interval register 86 expire with the bus remaining idle, comparator 88 detects equality between the values store in bus interval register 86 and bus cycle counter register 84. Comparator 88 asserts its output signal to combinatorial circuit 78. If the corresponding enable bit indicates that the bus idle time function is enabled, then combinatorial circuit 78 asserts the save context signal. In one embodiment, bus cycle counter register 84 and bus interval register 86 are sixteen bits wide and may store a value between zero and 65535 clock cycles.

It is noted that many other mechanisms may be employed to cause the save context signal to be asserted. Embodiments employing these mechanisms are contemplated. Additionally, the above discussion indicates that interval register 74 and bus interval register 86 are programmable. It is contemplated that, in one embodiment, such programming would be performed by an operating system running on computer system 10. Another embodiment is contemplated in which such programming is performed via scanning a value into the registers when computer system 10 is powered on. In one exemplary embodiment, the value may be scanned in according to IEEE standard 1149.1.

Figure 6:
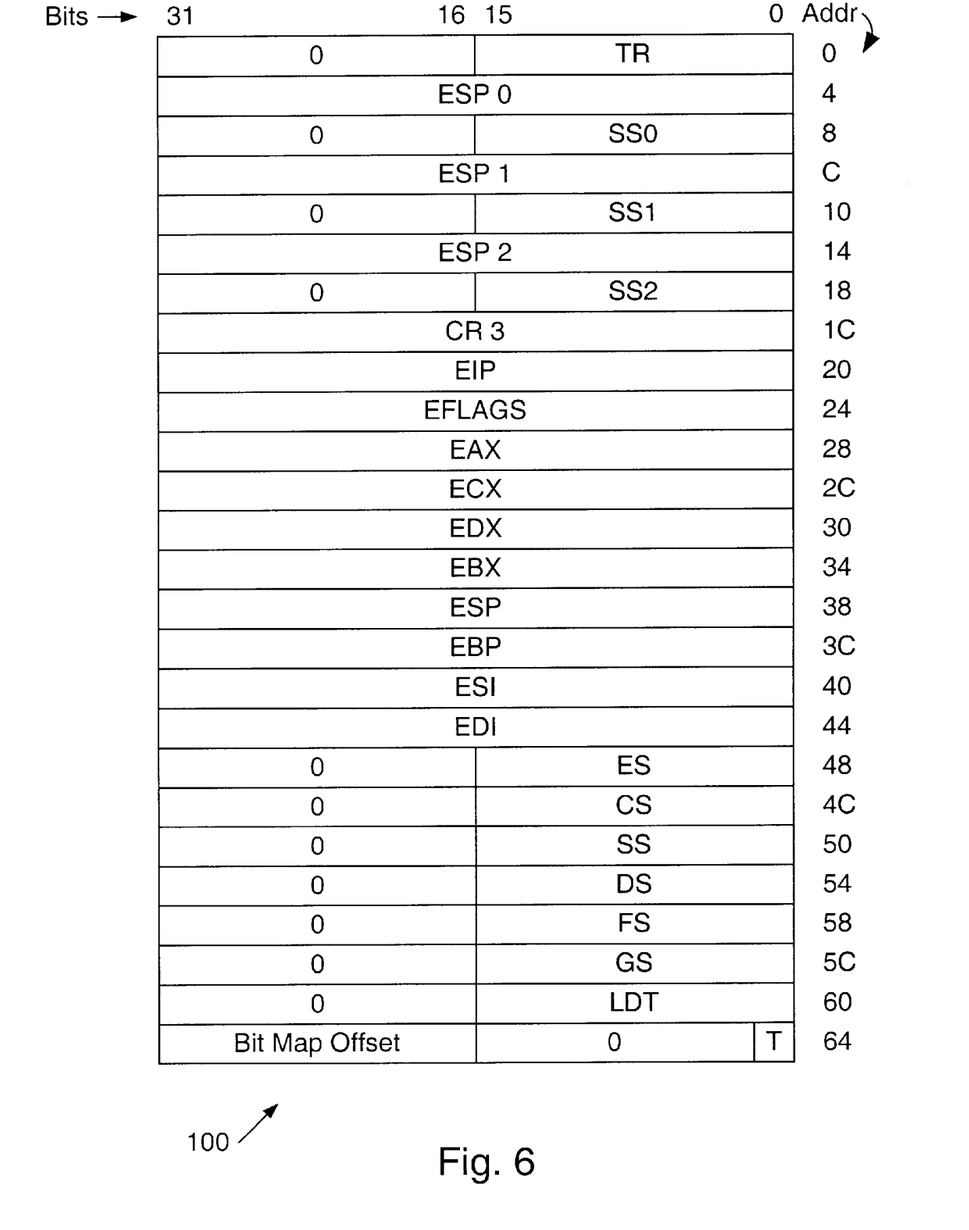
FIG. 6 is a diagram of one embodiment of a context storage location.

Turning now to FIG. 6, an exemplary context storage location 100 as defined by the x86 microprocessor architecture is shown. Context storage location 100 is a plurality of consecutive memory locations configured to store the context of one embodiment of microprocessor 12. Across the top of FIG. 6 are bit location numbers indicative of the number of bits shown on a line of context storage location 100. Down the right side of context storage location 100 is an address number indicative (in hexadecimal) of an offset from the beginning of context storage location 100 at which a particular line is stored. Fields within context storage location 100 which are marked "0" are set to a constant zero when context storage location 100 is initialized. Fields with other values are explained below.

At offset zero, the value from the task register (TR) is stored. The value stored is associated with a task which originated the task whose context is stored within context storage location 100. At offset 4, the value of the ESP register associated with a privilege level of zero is stored. As will be appreciated by those skilled in the art, the x86 architecture defines several privilege levels for tasks. At offset 8, the SS segment register associated with privilege level zero is stored. Similarly, the ESP and SS register values associated with privilege level one are stored at offsets C and 10, respectively. Offsets 14 and 18 store the ESP and SS register values associated with privilege level two, respectively.

Beginning at offset 1C and continuing through offset 44 are register values associated with the current context. As will be appreciated by those skilled in the art, the CR3, EIP, EFLAGS, EAX, ECX, EDX, EBX, ESP, EBP, ESI, and EDI registers are registers defined by the x86 microprocessor architecture. It is noted that CR3 is used to perform linear to physical translation if paging is enabled. Similarly, offsets 48 through 5C store the segment values from segment registers ES, CS, SS, DS, FS, and GS. At offset 60, a value identifying the local descriptor table (LDT) is stored. The LDT is part of the address translation mechanism of x86 processors, and may contain segmented to linear address translations associated with the current task. A bit map offset and a trap bit are stored at offset 64. The bit map offset indexes into a system input/output permissions table identifying which input/output devices 16 (shown in FIG. 1) a particular task is permitted to communicate with. The trap bit is used for debugging purposes. If the trap bit is set when a context restore occurs, then processor 12 interrupts to a debug interrupt vector. Additional information regarding the address translation mechanism and the input/output permissions may be found in the incorporated references.

Although the x86 architecture and a microprocessor implementing same have been used as an example above, the present invention is not limited to the x86 microprocessor architecture. Instead, any microprocessor architecture is suitable for use with the present invention. While the above discussion focused on interrupts generated via an external interrupt signal, interrupts may also be generated internal to microprocessor 12. For example, the x86 microprocessor architecture defines an INT instruction which causes an interrupt similar to the manner in which an interrupt signal causes an interrupt. For these instructions, context save unit 46 is configured to save the context immediately prior to executing the instruction, and so the instructions will operate according the their definition within the x86 architecture.

In accordance with the above disclosure, a microprocessor employing a periodic context save has been shown. By periodically saving the context, the clock cycles used to perform the context save may be performed prior to an interrupt being signalled. Advantageously, the interrupt service routine may be entered more rapidly because the context save need not be performed. Instead, execution of the interrupted task may resume from the most recent periodic context save. Performance of the microprocessor may be enhanced, particularly in computer systems which interrupt the microprocessor often.

Numerous variations and modifications will become apparent to those skilled in the art once the above disclosure is fully appreciated. It is intended that the following claims be interpreted to embrace all such variations and modifications.

What is claimed is:

1. A method for speeding interrupt handling in a microprocessor, comprising:

saving a context of said microprocessor independent of an interrupt signal received by said microprocessor during execution of a task;

receiving said interrupt signal in said microprocessor;

executing an interrupt service routine associated with said interrupt signal; and returning to said task according to said context saved prior to receiving said interrupt signal;

wherein said interrupt service routine is executed without a context save in response to receiving said interrupt signal.

2. The method as recited in claim 1 wherein said saving is performed after a fixed time interval.

3. The method as recited in claim 2 wherein said fixed time interval comprises a number of clock cycles.

4. The method as recited in claim 2 wherein said fixed time interval comprises a number of bus clock cycles.

5. The method as recited in claim 1 wherein said saving is performed after a variable time interval.

6. The method as recited in claim 5 wherein said variable time interval expires when a store queue within said microprocessor becomes full.

7. The method as recited in claim 5 wherein said variable time interval expires when a bus coupled to said microprocessor is idle for a fixed time period.

8. The method as recited in claim 5 wherein said variable time interval expires at the completion of another task.

9. The method as recited in claim 1 wherein said interrupt signal is generated within said microprocessor.

10. The method as recited in claim 1 wherein said microprocessor is configured to execute a variable-length instruction set.

11. The method as recited in claim 1 wherein said context storage location is a plurality of memory locations.

12. A microprocessor comprising:

an interrupt conductor configured to convey an interrupt signal indicative of a request to execute an interrupt service routine;

a context save unit configured to save a context of said microprocessor to a context storage location independent of said interrupt signal, and to effect the context save; and a register file coupled to said context save unit wherein said register file is configured to store a portion of said context;

wherein said context save unit comprises a store queue configured to buffer memory store accesses, wherein said store queue is configured to discard said memory store accesses in response to receiving said interrupt signal on said interrupt conductor.

13. The microprocessor as recited in claim 12 further comprising a data cache, wherein said store queue is configured to write said memory store accesses to said data cache in conjunction with said context save.

14. The microprocessor as recited in claim 12 wherein said context save unit comprises a register storage configured to temporarily store the contents of said register file prior to said context save.

15. The microprocessor as recited in claim 12 wherein said context save unit comprises a current context address register configured to store an address of said context storage location.

16. The microprocessor as recited in claim 15 wherein said context storage location is a plurality of memory locations.

17. The microprocessor as recited in claim 12 wherein said context save unit comprises a control unit configured to save said context after a fixed time interval.

18. The microprocessor as recited in claim 17 wherein said control unit comprises:

a first counter register configured to be incremented at regular time intervals;

a first interval register configured to store a number of increments of said first counter register which expire prior to performing said context save; and a first comparator coupled to said first interval register and said first counter register, wherein said first comparator is configured to compare values stored within said first counter register and said first interval register and to produce a compare signal indicative of the equality of said values.

19. The microprocessor as recited in claim 18 wherein said first compare signal causes said control unit to perform said context save.

20. The microprocessor as recited in claim 12 wherein said context save unit comprises a control unit configured to save said context after a variable time interval.

21. The microprocessor as recited in claim 20 wherein said control unit comprises:

a second counter register configured to be incremented at regular time intervals;

a second interval register configured to store a number of increments of said second counter register which expire prior to performing said context save;

a second comparator coupled to said second interval register and said second counter register, wherein said second comparator is configured to compare values stored within said second counter register and said second interval register and to produce a second compare signal indicative of the equality of said values; and a combinatorial circuit coupled to said second counter register and said second comparator, wherein said combinatorial circuit is configured to produce a context save signal if a bus coupled to said microprocessor is idle for a period of time, and wherein said combinatorial circuit is configured to reset said second counter circuit if said bus is busy.

22. The microprocessor as recited in claim 21 wherein said control unit is configured to perform said context save according to said context save signal.

23. A computer system comprising:

a microprocessor including:

an interrupt conductor configured to convey an interrupt signal indicative of a request to execute an interrupt service routine;

a context save unit configured to save a context of said microprocessor to a context storage location prior to receiving said interrupt signal, and to effect the context save; and a register file coupled to said context save unit wherein said register file is configured to store a portion of said context;

wherein said context save unit comprises a store queue configured to buffer memory store accesses, wherein said store queue is configured to discard said memory store accesses in response to receiving said interrupt signal on said interrupt conductor; and an interrupt controller coupled to said interrupt conductor wherein said interrupt controller is configured to convey said interrupt signal.

24. The computer system as recited in claim 23 further comprising a plurality of input/output devices coupled to said interrupt controller, wherein each of said plurality of input/output devices are configured to convey an interrupt request to said interrupt controller.

25. The computer system as recited in claim 24 wherein said interrupt controller is configured to convey said interrupt signal in response to said interrupt request.

26. The microprocessor as recited in claim 23 further comprising a data cache, wherein said store queue is configured to write said memory store accesses to said data cache in conjunction with said context save.

27. A method for speeding interrupt handling in a microprocessor, comprising:

saving a context of said microprocessor in response to a non-interrupt event;

receiving an interrupt signal in said microprocessor subsequent to said saving of said context;

executing an interrupt service routine without performing a context save in response to said receiving said interrupt signal; and returning from said interrupt service routine according to said context.

* * * * *